United States Patent [19]
Iwata

[11] Patent Number: 5,454,916
[45] Date of Patent: Oct. 3, 1995

[54] METHOD OF OBTAINING FRESH WATER FROM SEAWATER AND DEVICE USED THEREIN

[76] Inventor: Yosihiro Iwata, 809-2, Higashiirushuzei-cho Sagaru Nijyo Senbondori, Kamigyo-ku, Kyoto-shi, 602, Japan

[21] Appl. No.: 219,112

[22] Filed: Mar. 29, 1994

[51] Int. Cl.⁶ ..................................................... C02F 1/463
[52] U.S. Cl. .......................... 204/149; 204/152; 204/186; 210/748
[58] Field of Search ................................... 204/149, 152, 204/186

[56] References Cited

U.S. PATENT DOCUMENTS

| 5,124,012 | 6/1992 | Berleyev | 204/180.1 |
| 5,348,622 | 9/1994 | Deutsch et al. | 202/176 |

FOREIGN PATENT DOCUMENTS 1073664  6/1993  China.

Primary Examiner—John Niebling
Assistant Examiner—Arun S. Phasge
Attorney, Agent, or Firm—Flynn, Thiel, Boutell & Tanis

[57] ABSTRACT

In a method for obtaining fresh water from seawater, the seawater is passed through a plurality of precipitation tanks arranged in series and moreover it is stored for a given period of time in each precipitation tank, during which a signal of low frequency, low voltage and low current is applied to a pair of titanium electrode plates provided in each precipitation tank, the frequency of the signal to be applied to the precipitation tanks being gradually decreased in the flowing direction of the seawater, so as to separate oxygen from molecules which constitute the seawater and remove by precipitation the seawater molecules that are increased in salinity and specific weight being deprived of the oxygen therefrom. As a result, it is possible to obtain highly nutritious fresh water from seawater by a simple device safely at low cost.

15 Claims, 1 Drawing Sheet

METHOD OF OBTAINING FRESH WATER FROM SEAWATER AND DEVICE USED THEREIN

BACKGROUND OF THE INVENTION

1. Field of the Invention

The present invention relates to a method of obtaining fresh water from seawater and a device employed therein aboard a ship at sea etc.

2. Description of the Related Art

Distilled water obtained from seawater by distillation has been conventionally used for drinking water aboard a ship.

The conventional method of obtaining fresh water from seawater, however, requires an excessive heat energy for distilling seawater and is difficult in treating concentrated seawater. Moreover there is an apprehension that drainpipes are liable to be clogged by salt to make the whole device unusable and obtained fresh water is inferior in nutritive qualities.

The present invention has been made in respect of such problems to provide a method of safely obtaining highly nutritious fresh water from seawater at low cost employing a simple device for separating oxygen from molecules which constitute the seawater by applying a signal of low-frequency thereto so as to remove by precipitation the seawater molecules that are increased in salinity and specific weight being deprived of the oxygen therefrom.

SUMMARY OF THE INVENTION

In order to obtain the above object, the method of obtaining fresh water from seawater by passing the seawater through a plurality of precipitation tanks arranged in series according to the present invention is characterized in comprising the steps of applying a signal of low frequency, low voltage and low current to a pair of titanium electrode plates provided in each of the precipitation tanks to desalt the seawater for a given time during which the seawater is stored in each of the precipitation tanks, the frequency of the signal to be applied to the precipitation tanks being gradually decreased in the flowing direction of the seawater.

Moreover the device for obtaining fresh water from seawater comprising a plurality of precipitation tanks arranged in series through which the seawater is passed to be desalted according to the present invention is characterized in further comprising titanium electrode plates a pair of which are provided in each precipitation tank for receiving a signal of low frequency, low voltage and low current, valves provided between the precipitation tanks, centrifugal separators each of which is connected to the bottom portion of each precipitation tank at the inlet thereof and filters each of which is connected to the outlet of each centrifugal separator.

With the arrangement set forth above, for example, in case the seawater is 34% in salinity and the device is equipped with three-staged precipitation tanks, at first the seawater is supplied to the first-stage precipitation tank to be stored therein for about 4 hours, during which salt therein is separated therefrom and is precipitated out until the seawater is desalted to about 19% in salinity. The desalted seawater is transferred to the second-stage precipitation tank while new seawater is supplied to the first-stage precipitation tank. The frequency of the signal applied to the seawater in the second-stage precipitation tank is about ⅔ of that in the first-stage precipitation tank. The seawater is stored in the first- and second-stage precipitation tanks for about 4 hours, during which salt therein is separated from the seawater and is precipitated, and the seawater desalted to about 4% in salinity in the second-stage precipitation tank, the seawater desalted to about 19% in salinity in the first-stage precipitation tank and new seawater are transferred to the third-stage precipitation tank, the second-stage precipitation tank and the first-stage precipitation tank respectively. The frequency of the signal applied to the seawater in the third-stage precipitation tank is about ⅓ of that in the first-stage precipitation tank. The seawater is stored in each of the precipitation tanks for about 4 hours for separation and precipitation and finally almost fresh water is taken out from the third-stage precipitation tank by way of a centrifugal separator and a filter while the seawater desalted to about 4% in salinity in the second-stage precipitation tank, the seawater desalted to about 19% in salinity in the first-stage precipitation tank and new seawater are transferred to the third-stage precipitation tank, the second-stage precipitation tank and the first-stage precipitation tank respectively.

Thereafter the seawater desalted in the preceding-stage precipitation tank is successively transferred to the next-stage precipitation tank and new seawater is supplied to the first-stage precipitation tank.

In each precipitation tank, deposits containing much salt in the bottom portion thereof are discharged by way of a centrifugal separator and a filter, while the water which has been separated from the salt and filtered is utilized as primarily treated water or secondarily treated water after it is sterilized and further filtered.

DESCRIPTION OF THE PREFERRED EMBODIMENT

Figure 1:
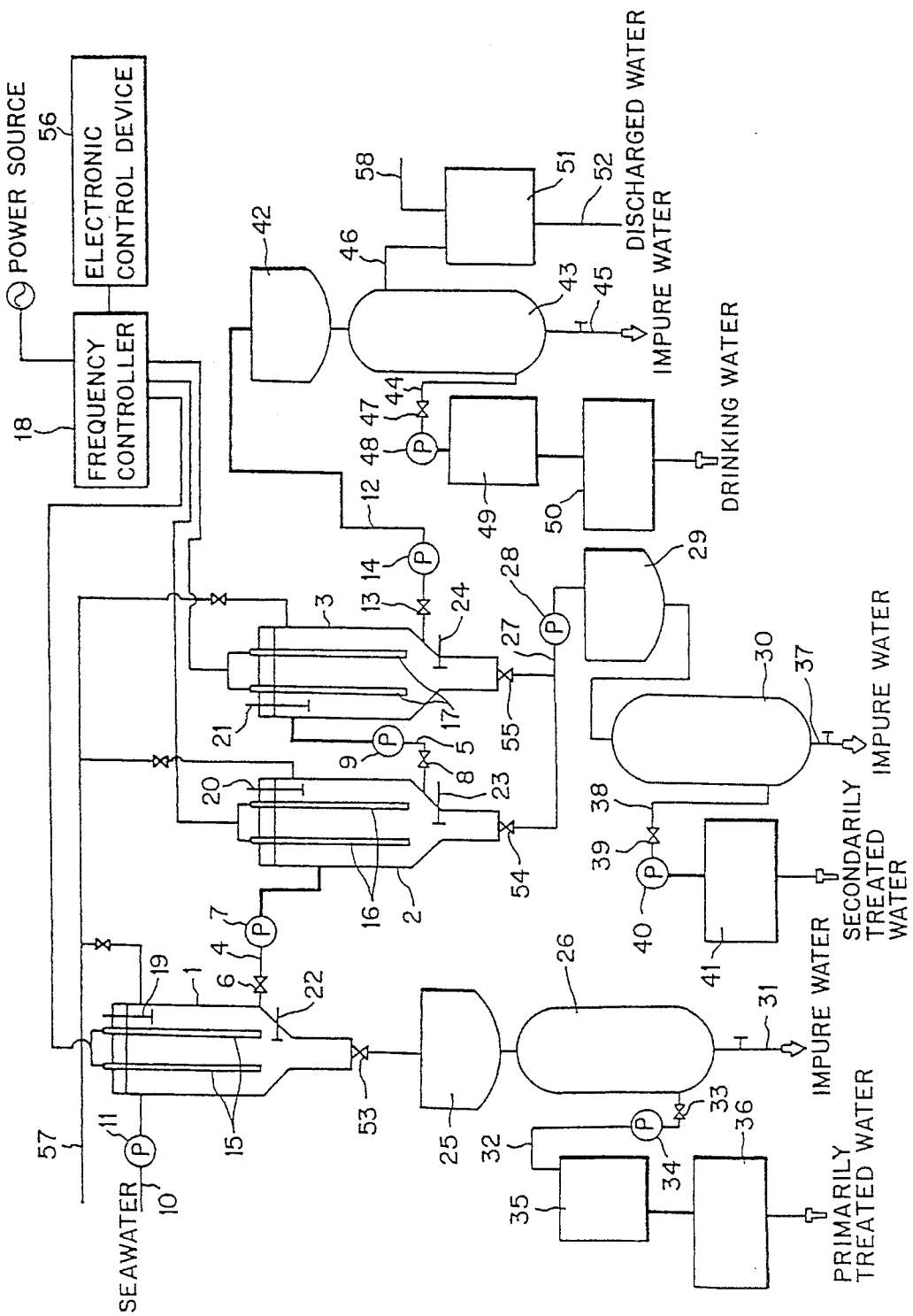
FIG. 1 is a block diagram of a device used in the method of obtaining fresh water from seawater according to the present invention.

An embodiment of the present invention will be described hereinafter with reference to an attached drawing.

In FIG. 1, denoted at 1 is a first-stage precipitation tank, 2 is a second-stage precipitation tank and 3 is a third-stage precipitation tank. The precipitation tanks 1, 2 and 3 each having a capacity of 200 liters are connected in series to one another by way of pipes 4 and 5. The pipe 4 is equipped with an electromagnetic valve 6 and a pump 7 and the pipe 5 is equipped with an electromagnetic valve 8 and a pump 9. A seawater supply pipe 10 equipped with a seawater supply pump 11 is connected to the inlet of the first precipitation tank 1. Moreover, a fresh water discharge pipe 12 equipped with an electromagnetic valve 13 and a pump 14 is connected to the outlet of the third-stage precipitation tank 3.

Pairs of electrodes 15, 16 and 17 composed of titanium member are provided in the precipitation tanks 1, 2 and 3 set forth above respectively and a frequency controller 18 connected to a power source applies a signal having a low frequency of 360 Hz, a low voltage of 4 V and a low current of 600 μA to the electrodes 15 and a signal having a frequency of 240 Hz to the electrodes 16 and a signal having a frequency of 120 Hz to the electrodes 17. As seen diagrammatically in FIG. 1 the electrodes 15, 16 and 17 do not extend to the bottom of the tanks 1, 2 and 3 with which they are respectively associated so as to leave a electrode free area in the lower end of each tank.

Upper limit water level sensors 19, 20 and 21 and upper limit precipitation level sensors 22, 23 and 24 are provided in the precipitation tanks 1, 2 and 3 respectively. A centrifugal separator 25 and a filter 26 are connected in series to the bottom portion of the precipitation tank 1 and the bottom portions of the precipitation tanks 2 and 3 communicate with each other by way of a pipe 27 and a centrifugal separator 29 and a filter 30 are connected in series to the pipe 27 by way of a pump 28.

An impure water discharge pipe 31 and a filtered water supply pipe 32 are connected to the filter 26 set forth above and a sterilization chamber 35 and a filter 36 is connected in series to the other end of the filtered water supply pipe 32 equipped with an electromagnetic valve 33 and a pump 34. An impure water discharge pipe 37 and a filtered water supply pipe 38 are connected to the filter 30 set forth above, and the filtered water supply pipe 38 equipped with an electromagnetic valve 39 and a pump 40 is connected to a sterilization chamber 41 at the other end thereof.

A centrifugal separator 42 and a filter 43 are connected in series to a fresh water discharge pipe 12 extending from the precipitation tank 3 and an impure water discharge pipe 45 and an overflowing water discharge pipe 46 are connected to the filter 43 respectively, and a sterilization chamber 49 and a filter chamber 50 serving as a storage tank is connected in series to the other end of the fresh water discharge pipe 44 equipped with an electromagnetic valve 47 and a pump 48. A storage tank 51 is connected to the other end of the overflowing water discharge pipe 46 and a water discharge pipe 52 is connected to the storage tank 51.

Denoted at 53, 54 and 55 are electromagnetic valves provided at the outlets in the bottom portions of the precipitation tanks 1, 2 and 3 respectively. Denoted at 56 is an electronic control device for a driving system and controls the pumps and electromagnetic valves in opening and closing the same in response to signals from the water level sensors etc. Moreover, denoted at 57 is a water supply pipe for washing the precipitation tanks 1, 2 and 3, and 58 is a water supply pipe for washing the storage tank 51.

With such an arrangement, when at first the seawater supply pump 11 is driven by the electronic control device 56, seawater having a salinity of, e.g., 34% is supplied to the first-stage precipitation tank 1 through the seawater supply pipe 10. Since at least the electromagnetic valves 6 and 53 are closed at that time, the seawater is gradually stored in the precipitation tank 1 and the water level thereof rises until the upper limit water sensors 19 detects the same, when the electronic control device 56 stops the operation of the seawater supply pump 11 and the frequency controller 18 applies a signal having a low frequency of 360 Hz, a low voltage of 4 V and a low current of 600 µA to the electrodes 15 for separating salt from the seawater in the precipitation tank 1. The signal applied across electrodes 15 through the tank 1 causes the salt in the seawater to precipitate and then migrate to electrode-free lower section of the tank.

When the seawater is treated for a given period of time, e.g., for 4 hours in the precipitation tank 1, the electronic control device 56 opens the electromagnetic valve 6 and operates the pump 7 so that the seawater which has been desalted to about 19% in salinity is transferred to the second-stage precipitation tank 2. Since the electromagnetic valves 8 and 54 are closed at that time, the seawater transferred from the precipitation tank 1 is gradually stored in the precipitation tank 2 and the water level thereof rises until the upper limit water level sensor 20 detects the same, when the electronic control device 56 stops the operation of the seawater supply pump 7, closes the electromagnetic valve 6 and drives the seawater supply pump 11 so that seawater is gradually stored in the precipitation tank 1 and the water level rises until the upper limit water sensor 19 detects the same, when the electronic control device 56 stops the operation of the seawater supply pump 11 and the frequency controller 18 applies a signal having a low frequency of 360 Hz as set forth above to the electrodes 15 and a signal having a low frequency of 240 Hz to the electrodes 16 for separating salt from the seawater in the precipitation tanks 1 and 2. Again, the signals applied across electrodes 15 and 16 through the upper sections of tanks 1 and 2, respectively, causes the salt in the water in these tanks to precipitate and migrate to the electrode-free lower sections of the tanks.

When the seawater is treated for a given period of time, e.g., for 4 hours in the precipitation tanks 1 and 2, the electronic control device 56 opens the electromagnetic valve 8 and operates the pump 9 so that the seawater which has been desalted to about 4% in salinity in the precipitation tank 2 is transferred to the third-stage precipitation tank 3. Since the electromagnetic valves 13 and 55 are closed at that time, the seawater transferred from the precipitation tank 2 is gradually stored in the precipitation tank 3 and the water level thereof rises until the upper limit water level sensor 21 detects the same, when the electronic control device 56 stops the operation of the seawater supply pump 9, closes the electromagnetic valve 8, opens the electromagnetic valve 6 and drives the pump 7 to transfer the seawater which has been desalted to about 19% in salinity in the precipitation tank 1 to the second-stage precipitation tank 2. The seawater which has been transferred from the precipitation tank 1 is gradually stored in the precipitation tank 2 and the water level thereof rises until the upper limit water level sensor 20 detects the same, when the electronic control device 56 stops the operation of the seawater supply pump 7, closes the electromagnetic valve 6 and drives the seawater supply pump 11 to gradually store the seawater in the precipitation tank 1 and rise the water level thereof until the upper limit water level sensor 19 detects the same, when the electronic control device 56 stops the operation of the seawater supply pump 11 and the frequency controller 18 applies a signal having a low frequency of 360 Hz as set forth above to the electrodes 15, a signal having a low frequency of 240 Hz to the electrodes 16 and a signal having a low frequency of 120 Hz to the electrodes 17 for separating salt from the seawater in the precipitation tanks 1, 2 and 3. As before, the signals applied across electrodes 15, 16 and 17 through tanks 1, 2 and 3, respectively, causes the salt dissolved in the water in the tanks to precipitate out and migrate to the electrode-free lower sections of the tanks.

When the seawater is treated for a given period of time, e.g., for 4 hours in the precipitation tanks 1, 2 and 3, the electronic control device 56 opens the electromagnetic valve 13 and operates the pump 14 so that the seawater which has been desalted almost as pure as fresh water in the precipitation tank 3 is transferred to the centrifugal separator 42, the seawater which has been desalted in the second-stage precipitation tank 2 is transferred to the third-stage precipitation tank 3, the seawater which has been desalted in the first-stage precipitation tank 1 is transferred to the second-stage precipitation tank 2 and new seawater is supplied to the first-stage precipitation tank 1 and then signals having low frequencies of 360 Hz, 240 Hz and 120 Hz are applied to the pairs of electrodes 15, 16 and 17 for a given period of time respectively for separating salt from the seawater in the precipitation tanks 1, 2 and 3. Thereafter these processes are repeated.

The seawater which has been desalted almost as pure as fresh water in the third-stage precipitation tank 3 as set forth above is divided into two liquid phases, i.e., that containing impurities much and that containing impurities little, thereafter the two liquid phases are filtered to be separated from each other by the filter 43 while overflowing water is transferred to the storage tank 51 by way of the overflowing water discharge pipe 46 to be discharged therefrom at need through the water discharge pipe 52. On the other hand, fresh water filtered by the filter 43 is transferred to the sterilization chamber 49 by way of the fresh water discharge pipe 44 being driven by the pump 48 through the electromagnetic valve 47 opened by the electronic control device 56 as much as the fresh water that has been taken out for use through the filter chamber 50. The fresh water is sterilized in the sterilization chamber 49 by ceramics etc. provided therein to get rid of colon bacilli etc., thereafter is stored in the filter chamber 50 that is a final storage tank to be used at need as drinking water etc. Impurities caught by the filter 43 is discharged through the impure water discharge pipe 45.

When the water level of the seawater of high salinity which has been precipitated in the first-stage precipitation tank 1 and collected in the bottom portion thereof is detected by the upper limit precipitation level sensor 22, the electronic control device 56 opens the electromagnetic valve 53 to discharge the seawater of high salinity to the centrifugal separator 25. The centrifugal separator 25 divides the seawater of high salinity into two liquid phases, i.e., that containing much impurities and that containing little impurities. Thereafter, the liquid phase containing little impurities is filtered by the filter 26 to be separated from the liquid phase containing much impurities and is transferred to the sterilization chamber 35 by way of the filtered water supply pipe 32 as much as the primarily treated water that has been taken out for use through the filter 36 being driven by the pump 34 through the electromagnetic valve 33 opened by the electronic control device 56. The liquid phase containing little impurities is sterilized in the sterilization chamber 35 to get rid of colon bacilli etc. and then is stored in the filter 36 that is a final storage tank to be used at need as a primarily treated water which contains oily substances. The impurities caught by the filter 26 are discharged by way of the impure water discharge pipe 31.

When the water level of the seawater which has been precipitated in the first- or second-stage precipitation tanks 1 and 2 and collected in the bottom portions thereof is detected by the upper limit precipitation level sensor 23 or 24, the electronic control device 56 opens the electromagnetic valve 54 or 55 to discharge the precipitated seawater by the pump 28 to the centrifugal separator 29, which divides the seawater into two liquid phases as described above, thereafter the liquid phase containing little impurities is filtered by the filter 30 to be separated from the liquid phase containing much impurities and is transferred to the sterilization chamber 41 by way of the filtered water supply pipe 38 as much as the secondarily treated water that has been taken out for use being driven by the pump 40 through the electromagnetic valve 39 opened by the electronic control device 56. The liquid phase containing little impurities is sterilized in the sterilization chamber 41 to get rid of colon bacilli etc. to be used as a secondarily treated water. The impurities caught by the filter 30 is discharged by way of the impure water discharge pipe 37.

As described above, oxygen is separated from molecules which constitute seawater to precipitate and remove the seawater that is increased in salinity and specific weight being deprived of oxygen by applying a signal of low frequency to the seawater in each precipitation tank, so that the seawater is reduced in salinity every time it passes through each of the precipitation tanks. Moreover, a signal having low frequency, low voltage and low current is applied to a pair of titanium electrode plates provided in each of three precipitation tanks arranged in series for passing the seawater therethrough to obtain fresh water, the frequency of the signal to be applied to the precipitation tanks 1, 2 and 3 being 360 Hz, 240 Hz and 120 Hz respectively which is gradually decreased in the flowing direction of the seawater, and moreover the seawater is stored for about 4 hours in each precipitation tank, so that it is possible to separate salt from the seawater to the extreme by setting the frequencies of the signals at maximal values which lower as the salinity of the seawater is reduced and finally obtain highly nutritious fresh water containing much oxygen. Since the electrode plates of titanium are employed, they are durable and less erosive and minute current flows smoothly therebetween, so that it is possible to apply an alternating current to the seawater efficiently.

Since the seawater precipitated in the bottom portion of each precipitation tank is rapidly discharged and is deprived of impurities by the cooperation of the centrifugal separator and filter and thereafter is sterilized to be used as primarily treated water or secondarily treated water, products other than the fresh water can be obtained and salt is less liable to stick to the pipes on the inside surfaces thereof.

If signals having, for example, frequencies of 300 Hz, 180 Hz and 50 are, respectively applied to the pipe 4 between the pump 7 and second-stage precipitation tank 2, the pipe 5 between the pump 9 and third-stage precipitation tank 3 and the fresh water discharge pipe 12 between the pump 14 and centrifugal separator 42 respectively, it is possible to remove salt from the seawater more effectively and obtain fresh water containing more oxygen.

As described above according to the present invention, since oxygen is separated from molecules which constitute seawater to precipitate and remove the seawater that is increased in salinity and specific weight being deprived of oxygen by applying a signal of low frequency to the seawater in each precipitation tank, so that the seawater is reduced in salinity every time it passes through each of the precipitation tanks and consequently it is possible to finally obtain highly nutritious fresh water containing much oxygen.

Moreover, a signal is applied to a pair of titanium electrode plates provided in each of a plurality of precipitation tanks arranged in series for passing seawater therethrough to obtain fresh water, the frequency of the signal to be applied to the precipitation tanks being gradually decreased in the flowing direction of the seawater, and moreover the seawater is stored for a given period of time in each precipitation tank, so that it is possible to separate salt from the seawater to the extreme by setting the frequencies of the signals at maximal values which lower as the salinity of the seawater is reduced and finally obtain highly nutritious fresh water containing much oxygen at low cost safely and efficiently.

Moreover, since the electrode plates of titanium are employed, they are durable and less erosive and minute current flows smoothly therebetween, so that it is possible to apply signals to the seawater efficiently and consequently obtain the fresh water at low cost more efficiently.

Still furthermore, since precipitate in each precipitation tank is treated by the centrifugal separator and a filter, it is possible to effectively make use of the primarily treated water or secondarily treated water too.

What is claimed is:

1. A method of obtaining fresh water from seawater including the steps of:

filling a first tank with seawater, said first tank having an upper section and a lower section, said step including supplying sufficient seawater to at least partially fill said upper section of said first tank;

applying a first alternating current signal at a select frequency across said upper section of said first tank so as to cause salt in the water in said upper section to precipitate out to said lower section of said first tank so as to partially desalt the water in said upper section of said first tank;

removing the partially desalted water in said upper section of said first tank and supplying the removed water to a second tank, said second tank having an upper section and a lower section wherein, said second tank is sufficiently filled so that said upper section of said second tank is at least partially filled with the partially desalted water; and applying a second alternating current signal having a frequency lower than said frequency of said first alternating current signal across said upper section of said second tank so as to cause the salt in the partially desalted water therein to precipitate out to said lower section of said first tank so as to further reduce salinity of the water in said upper section of said second tank.

2. A method of obtaining fresh water from seawater according to claim 1, further comprising the steps of:

further desalting the water partially desalted in said second tank by removing the partially desalted water from said upper section of said second tank and applying the partially desalted water to a centrifugal separator and a filter to produce finally desalted seawater; and sterilizing said finally desalted seawater in a sterilization chamber to remove bacteria and other contaminates therefrom in order to obtain drinking water.

3. A method of obtaining fresh water from seawater according to claim 1, wherein said seawater precipitated to the lower section of at least one of said tanks is also desalted by way of a centrifugal separator and a filter and thereafter is sterilized in a sterilization chamber to get rid of bacteria and other contaminates so that the water can be used as a treated water.

4. A method of obtaining fresh water from seawater according to claim 1, wherein said first and second alternating current signals are applied, respectively, to said first and second tanks for approximately 4 hours prior to the removal of the water from said upper sections of said tanks.

5. A method of obtaining fresh water from seawater according to claim 1, further including the steps of:

after the water in said upper section of said second tank is subjected to said further desalting in said second tank, removing the partially desalted water from said upper section of said second tank and supplying the water to a third tank, said third tank having upper and lower sections, said third tank being supplied with sufficient water to at least partially fill said upper section of said third tank; and applying a third alternating current signal having a frequency lower than said frequency of said second alternating signal across said upper section of said third tank so as to cause salt in the water contained therein to participate out to a lower section of said third tank so as to further reduce the salinity of the water in said upper section of said first tank.

6. A method of obtaining fresh water from seawater according to claim 5, wherein the frequencies of signals to be applied to said first, second and third tanks are, respectively, 360 Hz, 240 Hz and 120 Hz.

7. A method of obtaining fresh water from seawater according to claim 5, wherein said first, second and second alternating current signals each have a potential of approximately 4 volts, and said signals have a current of approximately 600 microamps.

8. A method of obtaining fresh water from seawater according to claim 5, further comprising the steps of:

further desalting the water partially desalted in said second tank by removing the partially desalted water from said upper section of said second tank and applying the partially desalted water to a centrifugal separator and a filter to produce finally desalted seawater; and sterilizing said finally desalted seawater in a sterilization chamber to remove bacteria and other contaminates therefrom in order to obtain drinking water.

9. A method of obtaining fresh water from seawater according to claim 5, wherein, partially desalted water is transferred from said first tank to said second tank over a first pipe, said partially desalinated water is transferred from said second tank to said third tank over a second pipe and said partially water desalinated water from said third tank is transferred to a storage tank over a third pipe, further including the step of:

apply alternating current signals to said first, second and third pipes, said signal applied to said second pipe being at a frequency less than said signal applied to said first pipe and said signal applied to said third pipe being a frequency less than said signal applied to said second pipe.

10. A method of obtaining fresh water from seawater according to claim 9, characterized in that the frequencies of said signal to be applied to said first, second and third pipes are respectively, 300 Hz, 180 Hz and 50 Hz.

11. A method of obtaining fresh water from seawater according to claim 1, wherein said first and second alternating current signals each have a potential of approximately 4 volts.

12. A method of obtaining fresh water from seawater according to claim 11, wherein said first and second alternating current signals have a current of approximately 600 microamps.

13. A method of obtaining fresh water from seawater according to claim 1, wherein said first and second alternating current signals have a current of approximately 600 microamps.

14. A method of obtaining fresh water from seawater according to claim 1, wherein:

said first alternating current signal is applied across said upper section of said first tank applying a signal across a first pair of electrodes located in said upper section of said first tank; and said second alternating current signal is applied across said upper section of said second tank by applying a signal across a second pair of electrodes located at said upper section of said second tank.

15. A method of obtaining fresh water from seawater according to claim 14, wherein said first and second electrodes are in the form of titanium electrode plates.

* * * * *

UNITED STATES PATENT AND TRADEMARK OFFICE
CERTIFICATE OF CORRECTION

PATENT NO. : 5 454 916
DATED : October 3, 1995
INVENTOR(S) : Yoshihiro Iwata

It is certified that error appears in the above-indentified patent and that said Letters Patent is hereby corrected as shown below:

Column 8, line 7; change "first, second and second" to
---first, second and third---.
line 27; change "water desalinated water" to
---desalinated water---.
line 39; after "are" insert ---,---.

Signed and Sealed this

Twenty-first Day of May, 1996

*Attest:*

BRUCE LEHMAN

*Attesting Officer*     Commissioner of Patents and Trademarks